United States Patent
Beausoleil et al.

(10) Patent No.: US 10,178,063 B2
(45) Date of Patent: Jan. 8, 2019

(54) SYSTEM AND METHOD FOR SERVING A MESSAGE CLIENT

(71) Applicant: Dropbox, Inc., San Francisco, CA (US)

(72) Inventors: Sean Beausoleil, Mountain View, CA (US); David Barshow, Menlo Park, CA (US); Scott Cannon, Mountain View, CA (US); Adam Cue, San Francisco, CA (US); Steven Flory, Los Altos, CA (US); Steven Kabbes, Mountain View, CA (US); Andrew Steven Long, San Jose, CA (US); Michael Roeder, Oakland, CA (US); George Milton Underwood, IV, Palo Alto, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 15/901,025

(22) Filed: Feb. 21, 2018

(65) Prior Publication Data

US 2018/0191661 A1 Jul. 5, 2018

Related U.S. Application Data (63) Continuation of application No. 14/084,142, filed on Nov. 19, 2013, now Pat. No. 9,935,907.

(Continued)

(51) Int. Cl.
*H04L 12/58* (2006.01)

(52) U.S. Cl.
CPC .............. *H04L 51/22* (2013.01); *H04L 51/06* (2013.01); *H04L 51/063* (2013.01); *H04L 51/26* (2013.01); *H04L 51/38* (2013.01)

(58) Field of Classification Search
CPC ........................................................ H04L 51/06
See application file for complete search history.

(56) References Cited

U.S. PATENT DOCUMENTS

| 5,754,178 A | 5/1998 | Johnston et al. |
| 5,822,526 A | 10/1998 | Waskiewicz |

(Continued)

FOREIGN PATENT DOCUMENTS

| AU | 2011253700 A1 | 12/2011 |
| CN | 102495692 A | 6/2012 |

(Continued)

OTHER PUBLICATIONS

Tsai, Henry, "Getting Started on Astrid's "Remind Me" Gmail Integration," Astrid.com, [online], Feb. 11, 2013, [retrieved on Jan. 3, 2013], retrieved from the internet: <URL:http://blog.astrid.com/b!og/2013/02/11/getteng-started.on- astrids-remind-me-extension>, 5 pages.

(Continued)

*Primary Examiner* — Shirley X Zhang
(74) *Attorney, Agent, or Firm* — DLA Piper LLP US (57) ABSTRACT

A system and method for synchronizing messages between client application instances and a message service provider includes a connection service communicatively coupled to a plurality of client messaging application instances; a first intermediary transfer layer with an inbound message data queue that queues message updates of a client application instance and an outbound message data queue that queues message updates and notifications from a mailbox service layer; a mailbox service layer communicatively coupled to the connection service through the first intermediary transfer layer; a second intermediary transfer layer with an mailbox message data queue that contains queued message data directed at the mailbox service layer and a message service data queue that contains queued message updates directed at a message service layer; and a message service layer configured for message interactions with an outside message service provider.

20 Claims, 8 Drawing Sheets

Related U.S. Application Data (60) Provisional application No. 61/728,635, filed on Nov. 20, 2012.

(56) References Cited

U.S. PATENT DOCUMENTS

| | | | |
|---|---|---|---|
| 6,411,684 B1 * | 6/2002 | Cohn | H04L 51/12 379/88.13 |
| 6,545,669 B1 | 4/2003 | Kinawi et al. | |
| 6,941,348 B2 | 9/2005 | Petry et al. | |
| 7,363,345 B2 | 4/2008 | Austin-Lane et al. | |
| 7,505,571 B2 | 3/2009 | Bhatia et al. | |
| 7,525,571 B2 | 4/2009 | Ando et al. | |
| 7,525,691 B2 | 4/2009 | Gordon et al. | |
| 7,788,218 B2 | 8/2010 | Gerritsen et al. | |
| 7,886,236 B2 | 2/2011 | Kolmykov-Zotov et al. | |
| 7,895,537 B2 | 2/2011 | Gruen et al. | |
| 8,005,462 B2 | 8/2011 | Roy | |
| 8,019,863 B2 | 9/2011 | Jeide et al. | |
| 8,054,294 B2 | 11/2011 | Sakai et al. | |
| 8,250,159 B2 | 8/2012 | Starbuck et al. | |
| 8,255,468 B2 | 8/2012 | Vitaldevara et al. | |
| 8,291,349 B1 | 10/2012 | Park et al. | |
| 8,316,095 B1 | 11/2012 | Wheeler et al. | |
| 8,390,577 B2 | 3/2013 | Lemort et al. | |
| 8,451,246 B1 | 5/2013 | Scholler | |
| 8,635,561 B1 | 1/2014 | Bullock et al. | |
| 8,775,520 B1 | 7/2014 | Lewis et al. | |
| 8,782,566 B2 | 7/2014 | Sarkar et al. | |
| 8,787,335 B2 | 7/2014 | Smith et al. | |
| 8,793,591 B1 | 7/2014 | Coleman et al. | |
| 8,836,147 B2 | 9/2014 | Uno et al. | |
| 8,839,147 B2 | 9/2014 | Kang et al. | |
| 8,910,068 B2 | 12/2014 | Shin et al. | |
| 9,063,989 B2 | 6/2015 | Buchheit et al. | |
| 9,248,376 B2 | 2/2016 | Yoshikawa et al. | |
| 9,360,998 B2 | 6/2016 | Bauder et al. | |
| 2002/0054117 A1 | 5/2002 | Van et al. | |
| 2002/0087704 A1 | 7/2002 | Chesnais et al. | |
| 2003/0020687 A1 | 1/2003 | Sowden et al. | |
| 2005/0015432 A1 | 1/2005 | Cohen | |
| 2005/0043015 A1 | 2/2005 | Muramatsu | |
| 2005/0068971 A1 | 3/2005 | Meisl et al. | |
| 2005/0081059 A1 | 4/2005 | Bandini et al. | |
| 2005/0181768 A1 | 8/2005 | Roy | |
| 2005/0275638 A1 | 12/2005 | Kolmykov-Zotov et al. | |
| 2006/0090137 A1 | 4/2006 | Cheng et al. | |
| 2006/0155810 A1 | 7/2006 | Butcher | |
| 2006/0190830 A1 | 8/2006 | Gerstl et al. | |
| 2006/0206570 A1 * | 9/2006 | Heidloff | H04L 51/08 709/206 |
| 2007/0038707 A1 | 2/2007 | Broder et al. | |
| 2007/0076857 A1 | 4/2007 | Chava et al. | |
| 2007/0229465 A1 | 10/2007 | Sakai et al. | |
| 2007/0277125 A1 | 11/2007 | Shin et al. | |
| 2008/0059590 A1 | 3/2008 | Sarafijanovic et al. | |
| 2008/0074399 A1 | 3/2008 | Lee | |
| 2008/0165145 A1 | 7/2008 | Herz et al. | |
| 2008/0201668 A1 | 8/2008 | Roy | |
| 2008/0208980 A1 | 8/2008 | Champan et al. | |
| 2008/0220798 A1 | 9/2008 | Potluri et al. | |
| 2008/0222540 A1 | 9/2008 | Schulz et al. | |
| 2008/0256179 A1 | 10/2008 | Gorty et al. | |
| 2008/0270548 A1 | 10/2008 | Glickstein et al. | |
| 2008/0294735 A1 * | 11/2008 | Muntermann | H04L 51/14 709/206 |
| 2009/0076966 A1 | 3/2009 | Bishop et al. | |
| 2009/0079699 A1 | 3/2009 | Sun | |
| 2009/0093277 A1 | 4/2009 | Lee et al. | |
| 2009/0150905 A1 | 6/2009 | Lin et al. | |
| 2009/0157831 A1 | 6/2009 | Tian et al. | |
| 2009/0172695 A1 | 7/2009 | Lazaroff et al. | |
| 2009/0178008 A1 | 7/2009 | Herz et al. | |
| 2009/0233618 A1 | 9/2009 | Bai et al. | |
| 2009/0244015 A1 | 10/2009 | Sengupta et al. | |
| 2009/0254624 A1 | 10/2009 | Baudin et al. | |
| 2009/0276701 A1 | 11/2009 | Nurmi | |
| 2009/0278806 A1 | 11/2009 | Duarte et al. | |
| 2009/0282360 A1 | 11/2009 | Park et al. | |
| 2009/0307623 A1 | 12/2009 | Agarawala et al. | |
| 2009/0313567 A1 | 12/2009 | Kwon et al. | |
| 2010/0031202 A1 | 2/2010 | Morris et al. | |
| 2010/0070594 A1 | 3/2010 | Yoshimura | |
| 2010/0095249 A1 | 4/2010 | Yoshikawa et al. | |
| 2010/0153493 A1 | 6/2010 | Clarke | |
| 2010/0199226 A1 | 8/2010 | Nurmi | |
| 2010/0210214 A1 | 8/2010 | Pawar et al. | |
| 2010/0214237 A1 | 8/2010 | Echeverri et al. | |
| 2010/0235794 A1 | 9/2010 | Ording | |
| 2010/0241973 A1 | 9/2010 | Whiddett | |
| 2010/0257241 A1 | 10/2010 | Hale et al. | |
| 2010/0295805 A1 | 11/2010 | Shin et al. | |
| 2010/0299638 A1 | 11/2010 | Choi | |
| 2011/0022471 A1 * | 1/2011 | Brueck | G06Q 30/02 705/14.61 |
| 2011/0074828 A1 | 3/2011 | Capela et al. | |
| 2011/0081923 A1 | 4/2011 | Forutanpour et al. | |
| 2011/0106880 A1 | 5/2011 | Strong et al. | |
| 2011/0163970 A1 | 7/2011 | Lemay | |
| 2011/0197153 A1 | 8/2011 | King et al. | |
| 2011/0202616 A1 | 8/2011 | Kinoshita | |
| 2011/0209195 A1 * | 8/2011 | Kennedy | G06F 21/55 726/1 |
| 2011/0289162 A1 | 11/2011 | Furlong et al. | |
| 2011/0295958 A1 | 12/2011 | Liu et al. | |
| 2011/0296351 A1 | 12/2011 | Ewing et al. | |
| 2011/0302515 A1 | 12/2011 | Kim | |
| 2012/0023375 A1 | 1/2012 | Dutta et al. | |
| 2012/0030407 A1 | 2/2012 | Pandey et al. | |
| 2012/0124147 A1 | 5/2012 | Hamlin et al. | |
| 2012/0131458 A1 | 5/2012 | Hayes | |
| 2012/0131474 A1 | 5/2012 | Panchadsaram et al. | |
| 2012/0131659 A1 | 5/2012 | Roy et al. | |
| 2012/0161458 A1 | 6/2012 | Sim | |
| 2012/0185781 A1 | 7/2012 | Guzman et al. | |
| 2012/0185797 A1 | 7/2012 | Thorsen et al. | |
| 2012/0210214 A1 | 8/2012 | Yoo et al. | |
| 2012/0210334 A1 | 8/2012 | Sutedja et al. | |
| 2012/0240054 A1 | 9/2012 | Webber | |
| 2012/0254793 A1 | 10/2012 | Briand et al. | |
| 2012/0256863 A1 | 10/2012 | Zhang et al. | |
| 2012/0290946 A1 | 11/2012 | Schrock et al. | |
| 2012/0304074 A1 | 11/2012 | Ooi et al. | |
| 2013/0035123 A1 | 2/2013 | Smith et al. | |
| 2013/0050118 A1 | 2/2013 | Kjelsbak et al. | |
| 2013/0057902 A1 | 3/2013 | Henry et al. | |
| 2013/0067392 A1 | 3/2013 | Leonard et al. | |
| 2013/0072263 A1 | 3/2013 | Kim | |
| 2013/0100036 A1 | 4/2013 | Papakipos et al. | |
| 2013/0104089 A1 | 4/2013 | Rieffel et al. | |
| 2013/0117713 A1 | 5/2013 | Bauder et al. | |
| 2013/0125063 A1 | 5/2013 | Lee et al. | |
| 2013/0145303 A1 | 6/2013 | Prakash et al. | |
| 2013/0167082 A1 | 6/2013 | Joo et al. | |
| 2013/0179517 A1 * | 7/2013 | Grosu | H04L 51/066 709/206 |
| 2013/0179801 A1 | 7/2013 | Audet et al. | |
| 2013/0204946 A1 | 8/2013 | Forstall et al. | |
| 2013/0290876 A1 | 10/2013 | Anderson et al. | |
| 2013/0290879 A1 | 10/2013 | Greisson | |
| 2013/0324222 A1 | 12/2013 | De Viveiros Ortiz | |
| 2014/0123043 A1 | 5/2014 | Schmidt et al. | |
| 2014/0129942 A1 | 5/2014 | Rathod | |
| 2014/0157182 A1 | 6/2014 | Kim | |
| 2014/0165012 A1 | 6/2014 | Shen et al. | |
| 2014/0304615 A1 | 10/2014 | Coe et al. | |
| 2014/0317545 A1 | 10/2014 | Miyazaki | |
| 2015/0032829 A1 | 1/2015 | Barshow et al. | |
| 2015/0112749 A1 | 4/2015 | Erdal | |
| 2015/0135337 A1 | 5/2015 | Fushman et al. | |
| 2015/0169068 A1 | 6/2015 | Plagemann et al. | |
| 2015/0277717 A1 | 10/2015 | Barabash et al. | |

(56) References Cited

U.S. PATENT DOCUMENTS

| | | |
|---|---|---|
| 2016/0026704 A1 | 1/2016 | Strong et al. |
| 2016/0104089 A1 | 4/2016 | Speich et al. |
| 2016/0274747 A1 | 9/2016 | Bauder et al. |

FOREIGN PATENT DOCUMENTS

| | | |
|---|---|---|
| EP | 1942401 A1 | 7/2008 |
| EP | 2116927 A2 | 11/2009 |
| EP | 2362592 A1 | 8/2011 |
| JP | 2009-151638 A | 7/2009 |
| JP | 2010-525740 A | 7/2010 |
| JP | 2011-188327 A | 9/2011 |
| JP | 2012-038292 A | 2/2012 |
| WO | 01/63875 A2 | 8/2001 |
| WO | 2008/030970 A2 | 3/2008 |
| WO | 2012/068401 A1 | 5/2012 |
| WO | 2012/068407 A2 | 5/2012 |
| WO | 2013/009092 A3 | 4/2013 |

OTHER PUBLICATIONS

Tsai, "Getting Started on Astrid's 'Remind Me' Gmail Integration," Astrid.com, retrieved online on Jan. 3, 2013, <URL: http://blog.astrid.com/blog/2013/02/11/getting-started-on-astrids-remind--me-extension>, Feb. 11, 2013, 5 pgs.

Orchestra To-do, 2013, [online], [retrieved on May 13, 2013], retrieved from the internet <URL: https://itunes.apple.com/us/app/orchestra-to-do>, 3 pages.

Klinker, Jacob, "Sliding Messaging Pro," 2013, [online], [retrieved on May 13, 2013], retrieved from the internet <URL:https://play.google.com/store/apps/details?id=com.klinkerandroid>, 3 pages.

International Search Report and Written Opinion dated Mar. 18, 2014 in PCT/US2013/071066, 14 pages.

International Search Report and Written Opinion dated Aug. 13, 2014 in PCT/US2013/071074, 15 pages.

International Preliminary Report on Patentability received for PCT Patent Application No. PCT/US13/71074, dated Jun. 4, 2015, 10 pages.

International Preliminary Report on Patentability received for PCT Patent Application No. PCT/US13/71066, dated Jun. 4, 2015, 12 pages.

Author: Guiding Tech Title: Hold Mouse Right Button for More Options on Drag and Drop Date: Jul. 1, 2012 pp. 1-6.

"Triage: Email First Aid," 2013, [online], [retrieved on May 13, 2013], retrieved from the internet <URL: https://www.triage.cc/>, 2 pages.

"Taskbox: Emails & Task Lists Rolled Into One," posted Apr. 22, 2013 by Jesse Virgil, [online], [retrieved on Jan 3, 2014], retrieved from the internet <URL: http://iphone.appstorm.net/reviews/productivity/taskbox-emails-task-lists-rolled-into-one/>, 12 pages.

"Taskbox—Mail," 2013, [online], [retrieved on May 13, 2013], retrieved from the internet <URL: https://itunes.apple.com/us/app/taskbox-mail>, 3 pages.

"Move Over Mailbox, Taskbox Is Better for Us Working Folks," Mar. 9, 2013, Niblitz.com, [online], [retrieved on Jan. 3, 2014], retrieved from the internet <URL: http://nibletz.com/2013/03/09/move-mailbox-taskbox-working-folks>, 2 pages.

"Browse through your email more efficiently with Swipe for Mail," posted Feb. 19, 2012 by Cody Lee, [online], [retrieved on May 13, 2013], retrieved from the internet <URL:http://www.idownloadblog.com/2012/02/19/swipemail-jailbreak-tweak/>, 5 pages.

"Activator: a free and extremely powerful jailbreak app launcher for iPhone," posted Feb. 1, 2010 by Thomas Wong, iSource.com, [online], [retrieved on May 13, 2013], retrieved from the internet <URL: http://isource.com/2010/02/01/activator-a-free-and-extremely-powerful>, 5 pages.

"[Quick Tip] Hold Mouse Right Button for More Options on Drag and Drop," Guiding Tech, Jul. 1, 2012, [online], <URL: http://www.guidingtech.com/12504/hold-mouse-right-button-more-drag- drop-options/>, 6 pages.

* cited by examiner

```
{
conversation: "plain text  string",
  preview: (first 100 characters of conversation),
    fullBody: boolean indicating whether there is more to be fetched
        for the "full" email,
    isHTML: boolean,
    stylings: [
        {
            index: (index of styling start on returned string),
            length: (length that the styling should span),
            type: NativeStyleType,
            data: (any extra data needed for the styling, like an
                href for a link),
        },...
    ]
}
```

FIGURE 3

| Email Content Format | Native Message Format |
|---|---|
| <br/> | /n |
| <p>, </p>, <div>, </div>, <html>,</html>, <head>, </head>, <body>, </body>, etc. | " " |
| <b>, </b> | NativeBoldText |
| <i>,</i> | NativeItalicText |
| <u>, </u> | NativeUnderlineText |
| <a href="foo">text</a> | NativeLink with index referencing txt and data="foo" |

SYSTEM AND METHOD FOR SERVING A MESSAGE CLIENT

CROSS-REFERENCES TO RELATED APPLICATIONS

This application is a continuation of U.S. patent application Ser. No. 14/084,142, filed Nov. 19, 2013, which claims priority to U.S. Provisional Patent Application No. 61/728,635, filed on Nov. 20, 2012, the content of which is herein incorporated by reference in its entirety.

TECHNICAL FIELD

This invention relates generally to the messaging field, and more specifically to a new and useful system and method for serving a message client in the messaging field.

BACKGROUND

Email is a ubiquitous form of communication in modern society. Email has grown beyond a tool for corresponding with others to a tool for organizing and managing people's lives and businesses. Despite the importance of email, the email structure is predominately reliant on old email protocols such as IMAP. The protocol was not designed with consideration of the mobile and real-time nature of today's computing environment. However, new messaging protocols are not yet as ubiquitous as email and thus email remains one of the dominant forms of communication despite its many limitations. Thus, there is a need in the messaging field to create a new and useful system and method for serving a message client. This invention provides such a new and useful system and method.

SUMMARY

The system and method for serving a message client of a preferred embodiment functions to provide a more efficient and responsive message client application that interfaces with a service provider. The system and method facilitate interfacing client application instances with an email service provider, but may alternatively or additionally interface with a social media messaging service, an instant messaging service, news or media stream service, or any suitable message service. Some primary benefits of the system and method can include intelligent message stream loading, real-time asynchronous messaging actions, message formatting improvements, online-offline synchronization, supporting more responsive client messaging actions, and/or fast attachment loading. Such improvements are preferably enabled by the cooperative management of messages on the device and in the cloud. The system and method can be designed to enable a message client application on a mobile device such as a phone, tablet or wearable computer, but may alternatively be used with any suitable computing device such as a desktop computer application, a browser mail client, TV connected computing device, or any suitable mail application.

DETAILED DESCRIPTION

The following description of the preferred embodiments of the invention is not intended to limit the invention to these preferred embodiments, but rather to enable any person skilled in the art to make and use this invention.

1. System for Serving a Message Client

Figure 1:
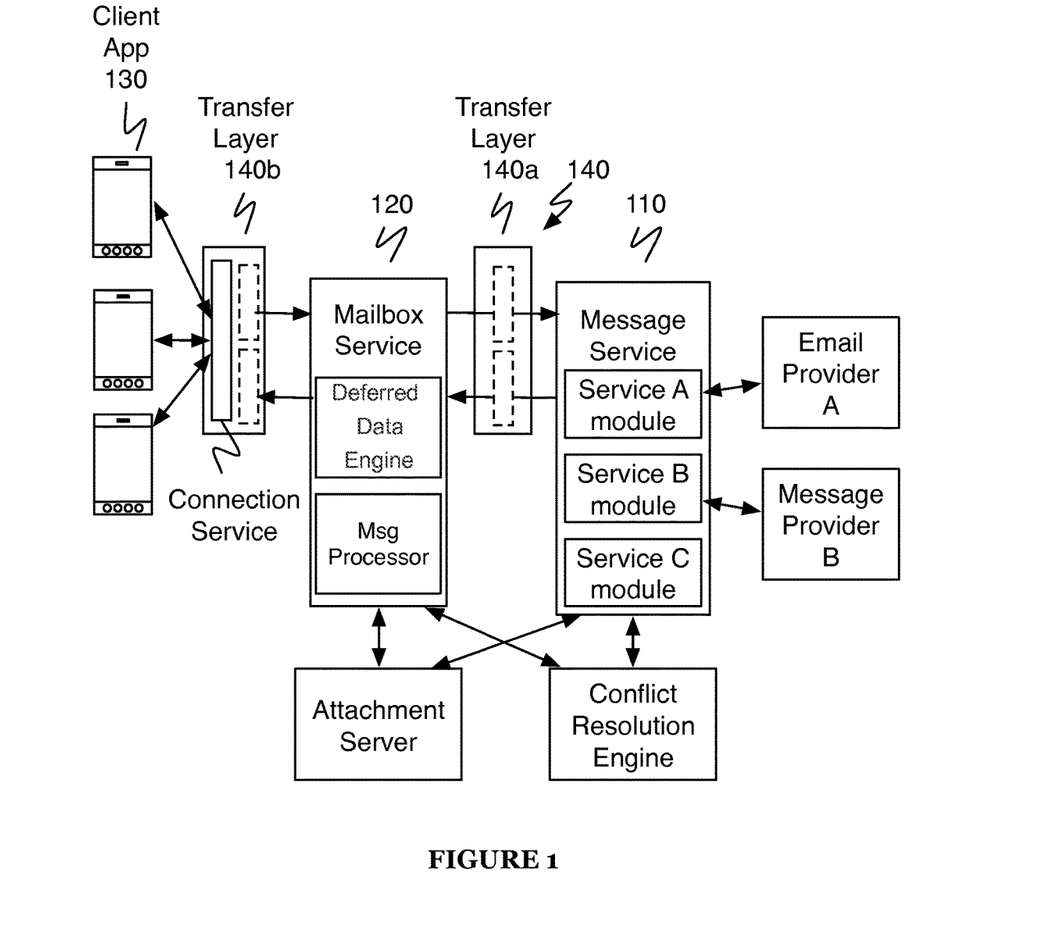
FIG. 1 is a schematic representation of a system of a preferred embodiment of the invention.

As shown in FIG. 1, a system for serving a message client of a preferred embodiment may include a message service layer 110, a mailbox service layer 120, a client application 130, and a transfer layer 140, The system functions to proxy an existing messaging service and enable a more efficient and responsive message client application. The system is preferably used to interface with an email service provider, but may alternatively or additionally interface with a social media messaging service, an instant messaging service, news or media stream service, or any suitable message service. Some primary benefits of the system may include intelligent message stream loading, real-time asynchronous messaging actions, message formatting improvements, online-offline synchronization, supporting more responsive client messaging actions, and/or fast attachment loading. Such improvements are preferably enabled by the cooperative management of messages on the device and in the cloud. The system is preferably designed to enable a message client application on a mobile device such as a phone, tablet or wearable computer, but may alternatively be used with any suitable computing device such as a desktop computer application, a browser mail client, TV connected computing device, or any suitable mail application.

The system preferably includes a backend server infrastructure that includes the message service layer 110, a first transfer layer 140a, a mailbox service layer 120, and a second transfer layer 140b. The backend infrastructure can be implemented on a managed distributed computing infrastructure, a multitenant computing infrastructure, a computing cluster, or on any suitable infrastructure. The components may include various resources that act as or provide server, load balancing, queuing, cacheing, database, storage, or other suitable components. The backend server infrastructure is preferably implemented to support a client application. The backend infrastructure preferably includes various design features that enable advanced features on the client application that are not natively provided by a message provider. The backend infrastructure can serve as an intermediary layer that coordinates advanced features of the client application.

The message service layer 110 of a preferred embodiment functions to interface with an outside message service. The message service layer 110 is preferably a server in a distributed computing infrastructure. The message service layer 110 preferably manages message communication to and from a message service provider. The message service provider is preferably an email provider such as Google mail, Yahoo mail, Hotmail, or other mail services. The message service provider may alternatively interface with alternative forms of messaging services such as social network messaging, instant messaging, or any suitable messaging service. The message service layer 110 is preferably a collection of servers and services that collectively operate to fulfill tasks that enable coordinating with an outside service provider. The message service layer 110 may include load balancing such that the service of the backend layer can scale to support increased demand. As each message service provider may have a custom implementation, the message service layer 110 can include a provider module or component that defines message handling of the system for at least one specified message service provider. The provider module is preferably configured specifically for the intended service provider and includes rules and processing instructions to account for message format issues, for interpretation of message updates, specialized features or capabilities, and/or any suitable processing that may be specific to the message service provider.

For email service providers, the message service layer 110 preferably uses a persistent IMAP (Internet Message Access Protocol) connection for receiving and manipulating messages. The persistent IMAP connection is preferably made per account. A benefit of the message service layer 110 establishing the IMAP connection is that any number of client applications may now interact with messages without worrying about the IMAP connection restriction. For example, a user may have multiple instances of a client application open on various devices, but each instance can share the IMAP connection instead of the client applications individually maintaining an IMAP connection from the device. Outgoing mail is preferably delivered to the message service provider through typical means such as an SMTP (Simple Mail Transfer Protocol) connection or any suitable outbound message protocol. The message service layer 110 can additionally or alternatively use connections such as POP MAPI/Exchange, Service APIs and/or any suitable connection to interact with a message service provider. The message service layer 110 additionally translates account or message updates, delivered from the client/mailbox service, into appropriate actions to execute on the message provider. Account or message updates can include adding new folders, sorting messages into folders, starring a message, flagging a folder, marking a message as read/unread, and/or any suitable update between the client application and the message service provider. The server of the message service layer 110 preferably manages a plurality of messaging accounts.

The message service layer 110 can additionally convert data from the message provider for use within the system. A conversation parser can extract new portions of emails and convert them to a mailbox native format. Emails from various sources or from various service providers may include different formats or meta data. Some components of the email service format may be set to enable particular features within the service provider. When converting to a mailbox native format, the message format is preferably normalized to a consistent and uniform message format that can be used within the system. Normalizing the message format to a native message format functions to simplify design of other components in the system and enable various message sources to be integrated into the system. Herein, native message format describes a standardized data modeling approach to embody content and parameters of the message. The message service layer 110 additionally includes logic to translate message updates from a client application or other portions of the system into instructions compatible with the message service provider. Actions such as "archive all", "empty trash", "mark as unread", and/or any suitable message update action preferably includes logic that guides the processing and communication of message updates directed at the message service.

The message service layer 110 may additionally store meta data parameters of the message provider such as message count in a folder. In one preferred embodiment, a message thread is the predominant message form. Thus the message service layer 110 may convert or incorporate individual messages into a message thread. A thread may be any suitable related messages such as messages replying to another message, forwarding a message, messages with shared subjects, a message quoting a portion of a message and/or any suitable grouping of a message. The message service 110 preferably uses a provider thread ID or alternatively an inbox scanning process to add messages to a thread.

The mailbox service 120 of a preferred embodiment functions to manage the mailbox for a client application. The mailbox service 120 is preferably an intermediary server that is communicatively coupled to the client application 130 and the message service 110. More preferably, the mailbox service 120 is communicatively coupled to the client application 130 with a first intermediary transfer layer 140*a*, and communicatively coupled to the message service 110 with a second intermediary transfer layer 140*b*. The mailbox service 120 preferably leverages a custom network protocol optimized for modem message communication. As one aspect of the protocol, a tokening system may be employed to track what has been transferred, how recently message updates are transferred, and guarantee that data is properly communicated. Alternatively, any suitable protocol may be used such as HTTP. The mailbox service 120 may provide any number of services. A first service may include message windowing. Message windowing preferably describes the transfer of only immediately relevant messages to the client application. For example, the mailbox service 120 preferably only transfers information for the 100 most recent messages when a user accesses his or her inbox even if there are 500 unread messages the user has not seen. The mailbox service layer 120 or alternatively the message service layer 110 can manage state and windowing of multiple message streams. Message streams preferably describe different collections of messages. A client application can be designed to provide frequent access to set message streams. An email inbox folder is preferably one message stream. Other message streams can include archive, message folders, labels, special folders (e.g., starred messages or deferred messages), and/or any suitable collection of messages. Maintaining the message streams in the backend infrastructure avoids delays caused by on demand access of an outside service provider when switching between message streams. Stream or message records may be created and/or modified to appropriately direct message sorting and organization. For example, the system can additionally organize a message according to sorting history. In this way, moving a message to another stream places that message at the top of the stream when presented to a user on a client application. This sorting organization can be an overriding sorting parameter on top of chronological organization. When receiving updates from a client application, the mailbox service 120 may additionally translate the update into a message service update. For example, if a message is moved to a particular list on the client application, the mailbox service may create a "tell Gmail to copy message thread 1048 to folder and expunge" instruction to deliver to the message service.

The mailbox service 120 may additionally include a deferred data engine. The deferred data engine functions to enable messages to be conditionally acted upon when a condition is satisfied. In a first variation, users can place messages in a deferred message list with an assigned reminder condition. The reminder condition is typically a time condition (e.g., "remind me in 24 hours", "remind me on June 22", etc.), but the reminder condition may additionally or alternatively use geolocation of the user, absolute geolocation of other users, geolocation of users relative to the device user, response by another recipient of the message, response to another message, device access (e.g., next time on desktop computer), a combination of Boolean logic for multiple conditions, programmatic logic (e.g., accessed through application programming interface or "API"), and/or any suitable conditions. Once a condition or conditions are satisfied the deferred data engine can take the appropriate action. The action or response is preferably moving the message or message thread into the inbox. This may involve sending data to the client application and/or to the mailbox service. The action may alternatively be any suitable action such as moving to another folder, sending a pre-composed response, archiving a message, deleting a message, sharing on a social network, sending an alert, or any suitable action.

The mailbox service 120 may include a message processing module that transforms the message into a suitable format for use within the system. As one preferred message transformation, the body of the email is converted to a uniform format. This preferably can involve converting HTML formatted messages to natively translatable format. The natively translatable format is one that is configured for rendering natively on client applications. This functions to work around slow and resource intensive HTML rendering on a mobile device. HTML content may additionally be normalized, refined, or stripped to simplify and make messages have a consistent presentation. The content of a message may additionally be obfuscated to protect message content within the system. The message service layer 110 can additionally include a component configured to facilitate converting attachment formats. Attachments are preferably media files included in message content, such as photo or file attachment in an email. A service preferably converts the attachments to inline items of the message. An attachment service preferably stores and hosts the media resources reference in the inline items.

The client application 130 of a preferred embodiment functions to provide a user interface and interaction capabilities for the messages. The client application 130 is preferably for a mobile device but may alternatively be for any suitable device application such as an application for a desktop computer, television-connected computing device, a website, a browser plug-in, or any suitable device application. Herein references to a client application refers to an instance of a type of client application installed on a device. Multiple instances of a client application can be active on different devices and/or the same device. The different application instances can additionally include instances operating different applications or versions of applications. The client application 130 preferably interprets the message with natively rendered views as opposed to HTML webviews. HTML views may alternatively be used in client applications where there is little drawback to HTML rendering. The client application 130 preferably includes an asynchronous message communication module which functions to seamlessly synchronize messages between the client application and the mailbox service 120. The asynchronous message communication module preferably alleviates the user pain of waiting for messages to load and send. The asynchronous message communication module preferably performs network communication in the background without blocking user interaction. The client application 130 preferably has at least one message account configured, but may alternatively have a plurality of message accounts and the message accounts may additionally be of different types (e.g., email and social media). Any suitable interface may be used by the client application 130 but a gesture based message-sorting interface preferably leverages the real-time and responsive nature of the message communication system.

The transfer layer 140 of a preferred embodiment functions to coordinate communication between the message service 110, the mailbox service 120, and the client application 130. There are preferably at least two transfer layers 140a and 140b. A first transfer layer 140a preferably communicatively couples the message service 110 and the mailbox service 120. A second transfer layer preferably communicatively couples the mailbox service 120 and the client application 130. The transfer layer 140 preferably queues messages and data communications in both communication directions. The client to mailbox transfer layer preferably queues sent messages, message actions, and other communications in a queue inbound to the mailbox. The client to mailbox transfer layer additionally queues data and responses to client, which may include new email messages, thread updates, and client responses (e.g., email sent OK, defer message OK). The message service to mailbox transfer layer preferably queues email service work from the mailbox in a queue inbound to the message service. The message service to mailbox transfer layer additionally queues message data updates in a queue inbound to the mailbox service. The queues preferably use rabbitMQ but may use any suitable queuing framework. The second transfer layer 140 may additionally include a connection service. The connection service preferably manages all connections from a client application to the mailbox service. The connection service preferably authorizes and establishes stream connections of client applications. Multiple client application instances may have a streaming connection to the connection service, and the connection service multiplexes client bound data to the plurality of client applications. For example, a user may have multiple devices with active client applications (configured for the same account) with a stream connection. An outbound message is preferably simultaneously transmitted across multiple stream connects to deliver to the various client application instances. The connections independently maintained for each device are substantially simultaneously used. The connection service may additionally manage version control of client application and implement size-selective data compression, and/or any other additional connection and streaming services.

The system may additionally include a conflict resolution module that functions to resolve conflicts in message management between the distributed portions of the system. Any action or communication submitted to a service of the system is preferably a transactional unit that includes a revision identifier. The revision identifier is preferably indicative of whether the current message data is the most recent, currently valid message. This is used to make message data objects within the system eventually consistent with the native environment of the message (e.g., the email provider). The revision identifier is additionally applied by the conflict resolution module to order actions taken by a user from within the client application to be the order that those actions are processed within the system to resolve consistency. Additionally, the system is configured such that actions are completed atomically on objects within the system. State in any particular portion of the system may not be consistent with other portions, but the state is preferably eventually consistent with the state of the message provider. For example, if a user moves messages in different folders, those moves may propagate through the system, and eventually the message provider will reflect those changes. When conflicts are encountered, state from particular components are given precedence over other components. In some situations the conflict resolution module may allow any suitable action to win during a race condition. An additional aspect of the conflict resolution module is that any action taken on a message conversation, thread, or collection of messages within the message system preferably has a document level revision that corresponds to the number of new messages that have arrived on the thread, which functions to enforce that new emails from an inbox folder that arrive from any message service provider bring the thread into the inbox.

2. Methods for Serving a Message Client

Figure 2:
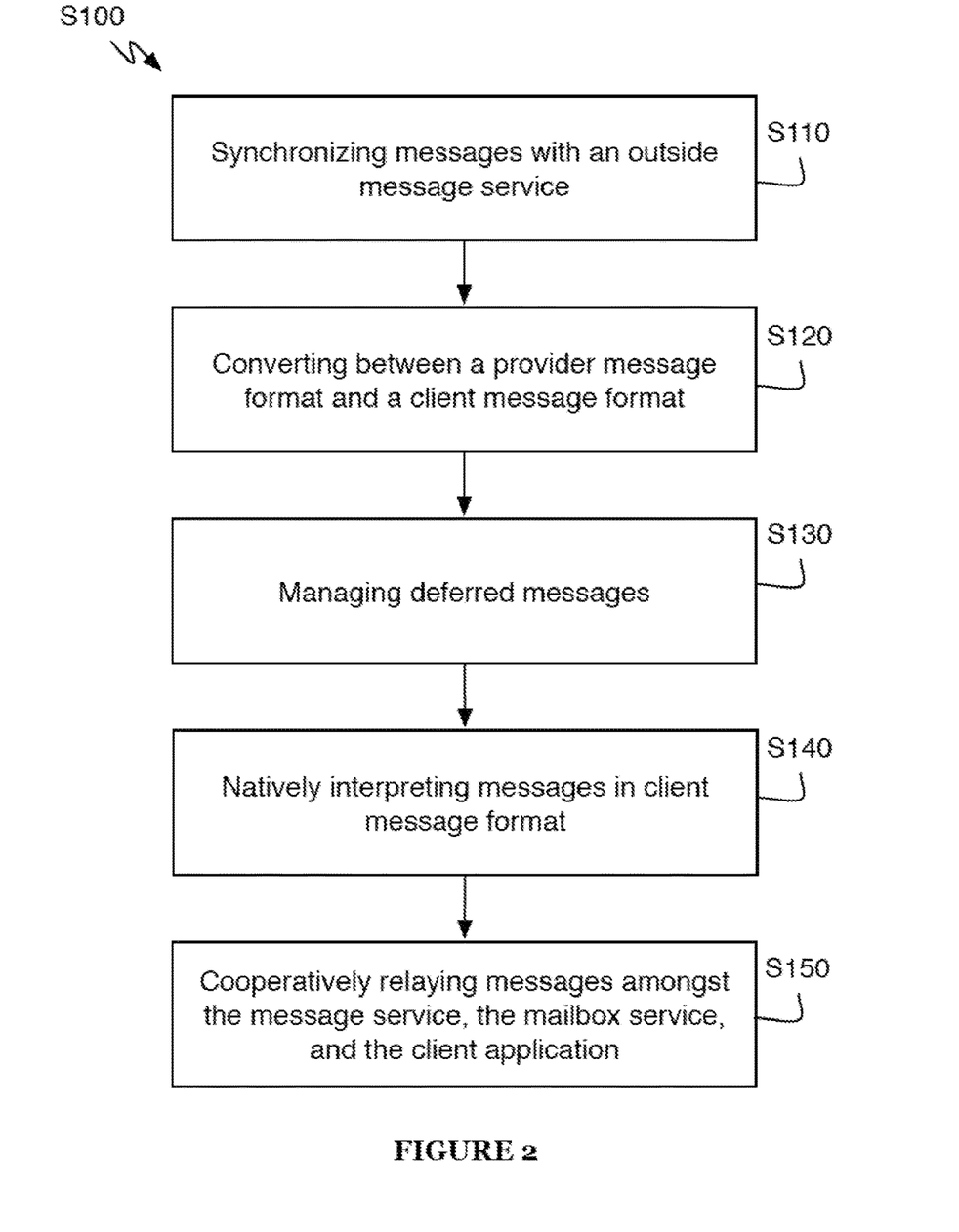
FIG. 2 is a flowchart representation of a method of a preferred embodiment of the invention.

As shown in FIG. 2, a method S100 for serving a message client of a preferred embodiment may include at a message service, synchronizing messages with an outside message service S110; at a mailbox service, converting between a provider message format and a client message format S120; at the mailbox service, managing deferred messages S130; at a client application, natively interpreting messages in client message format S140; and cooperatively relaying messages amongst the message service, the mailbox service, and the client application S150. The method functions to abstract existing message services into a real-time, responsive messaging interface. Preferably, the method is used for creating a fast and responsive email application. The method preferably transforms existing email services and messages for new and enhanced functionality while synchronizing with the email service for consistency with the email service. The method is preferably employed as a distributed computing system with a client application interface. The method enables a user to use existing message accounts with enhanced communication capabilities. The method is preferably implemented through a system substantially similar to the system described above but any suitable system may alternatively be used. Method S100 may additionally include two alternative synchronization embodiments: a method S200 for synchronizing message data from a client application to a messaging service and a method S300 for synchronizing message data from a message service to at least one client application. Methods S100, method S200, and method S300 can be used in any suitable combination.

Block S110, which includes at a message service, synchronizing messages with an outside message service, functions to interface with an outside message service provider. In one preferred embodiment, the outside message service is an email service provider such as Gmail, Yahoo Mail, Microsoft Exchange, but may alternatively be a social network API, or instant messaging service, or any suitable messaging service provider. A message service interfacing with an email provider preferably manages a persistent IMAP connection for each account, but the connection may alternatively be a POP, Microsoft Exchange, Service API, and/or any suitable connection. A single IMAP connection is preferably used by multiple mailbox client application instances of the same service account. Synchronizing messages with the outside message service can include retrieving inbound messages from the message service provider. When inbound messages are part of a conversation, synchronizing messages may include parsing a conversation, extracting new portions of a message and converting them to a mailbox service format. Synchronizing messages with the outside message service can additionally include transmitting client message interactions to the messages service provider. This may include sending outbound messages, changing the state of a message (e.g., marking as read), changing the state of message organization (e.g., moving a message to a folder, adding a label, adding reference to a category), and/or any suitable action that may need to be communicated to the message service provider. Synchronizing may additionally manage tracking meta data of messages. For example, the message service may count or track the number of messages and/or unread messages in a particular folder.

Figure 3:
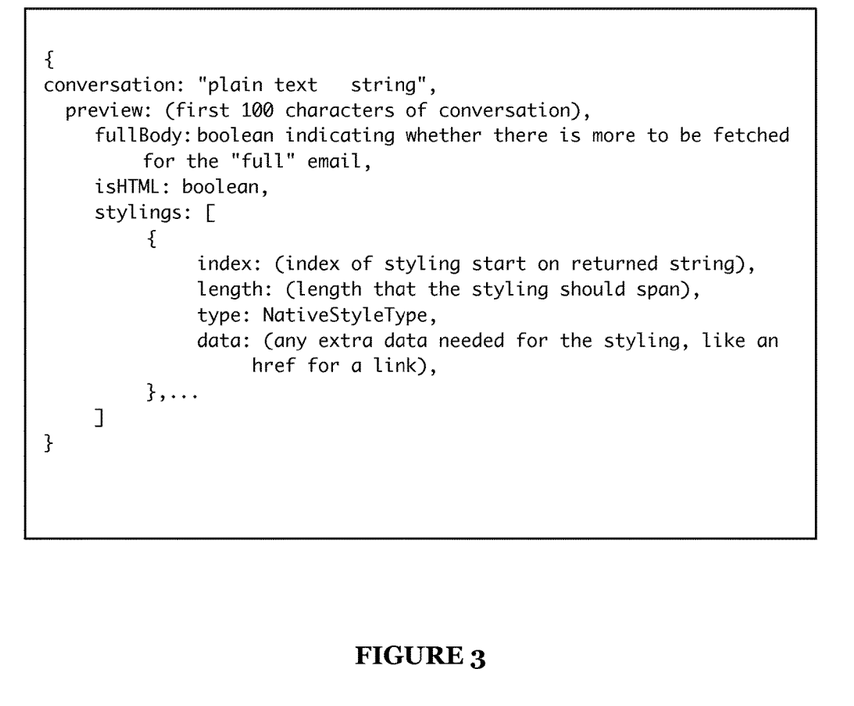
FIG. 3 is an exemplary depiction of a native message format data object.
Figure 4:
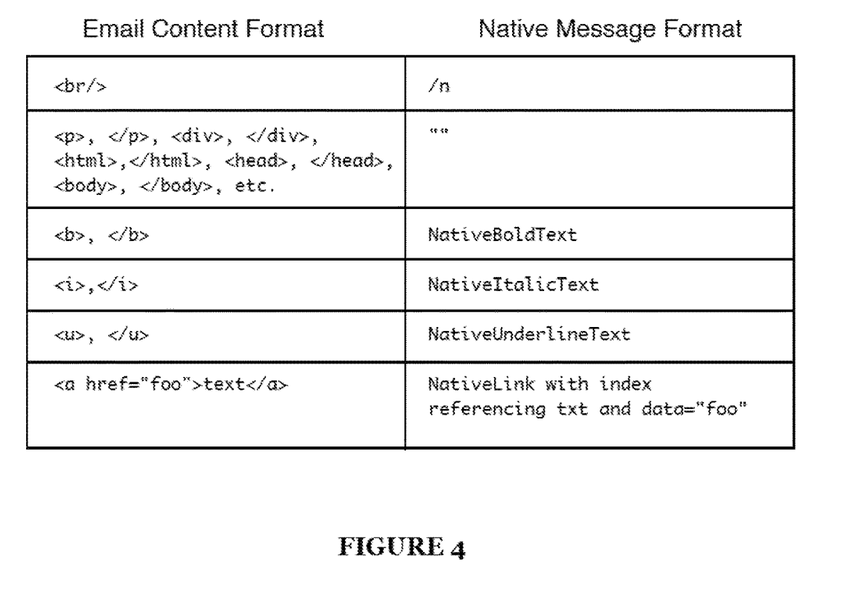
FIG. 4 is a table of exemplary message format mappings.

Block S120, which includes, at a mailbox service, converting between a provider message format and a client message format, functions to translate to the message format to that of the recipient. Inbound messages from the messaging service are preferably converted to a client native message format. The native message format is preferably a streamlined data format, and is designed for efficient delivery and rendering by a client application. Converting to a native message format may include converting HTML formatted messages to native rendering format. The native message format preferably strips content of undesired content styling attributes and unnecessary information. The native rendering format preferably parameterizes aspects of the message into parameters of a data-interchange object. In one variation, the native message format is a JSON object as shown in FIG. 3. As shown in FIG. 4, message content formatting/styling attributes are preferably mapped to different natively rendered parameters. For example, paragraph tags, div tags, html tags, header tags, body tags, and other suitable tags are preferably replaced with the empty strings; bold tags are replaced with a bold string parameters; anchor tags are replaced with link parameters detailing text and a URI reference; and/or any suitable tag may be mapped to a parameter defined for the message. The native message format can additionally include an "is HTML" parameter that selectively enables native or HTML rendering of all or part of a message on the client application. One added benefit is this enables a consistent style to the message content to be applied.

Converting may include uploading attachment files to an attachment service of the system and converting attachments to inline items. This subprocess is particularly applicable to email related use cases. Attachment conversion can similarly be applied to other media messaging message protocols and mediums. Messages can be transmitted more efficiently and attachments used in a more flexible and diverse manner. Uploading to an attachment service can include various applications. In one variation, the message server synchronizes with an online data hosting solution (e.g., the Dropbox service), an interface to the attachment service can enable richer interaction capabilities. For example, sharing the attachment with other users of the client application can result in shared access to the attachment resource. In other words, only one instance of the attachment may be required since both users can access the inline-referenced file. Messages may additionally be obfuscated, which functions to add a level of privacy. The obfuscated messages are in an unreadable format for humans as the messages are passed through the system. The obfuscation process is reversed when delivered to the client application or the messaging service provider. Outbound messages and other client message interactions are preferably translated into message service updates. For example, a new email may be sent, and the email may be converted into a format for delivery to the message service. In another example, a user may archive a message on a client application, a message service update to archive the message.

Block S130, which includes at the mailbox service, managing deferred messages S130, functions to enable automatic deferred message features. A deferred message engine substantially similar to the one described above preferably manages deferred messages. Deferred messages may alternatively be managed by a deferred message engine in any suitable component of the messaging system. Managing deferred messages preferably includes receiving deferred message updates, monitoring deferred messages for condition validation; and triggering a message response when the condition is validated. Managing deferred messages can be used to enable a feature where messages are removed from an inbox until a condition is satisfied. The condition is typically time based, but may alternatively be a condition based on the geolocation of the user, absolute geolocation of other users, geolocation of users relative to the device user, response by another recipient of the message, response to another message, device access (e.g., next time on desktop computer), a combination of Boolean logic for multiple conditions, programmatic logic (e.g., accessed through an API), and/or any suitable conditions. In one variation, the message response is adding the message to the inbox. Other message responses may include moving the message to another folder, sending a pre-composed response, archiving a message, deleting a message, sharing on a social network, sending an alert, or any suitable action.

Figure 5:
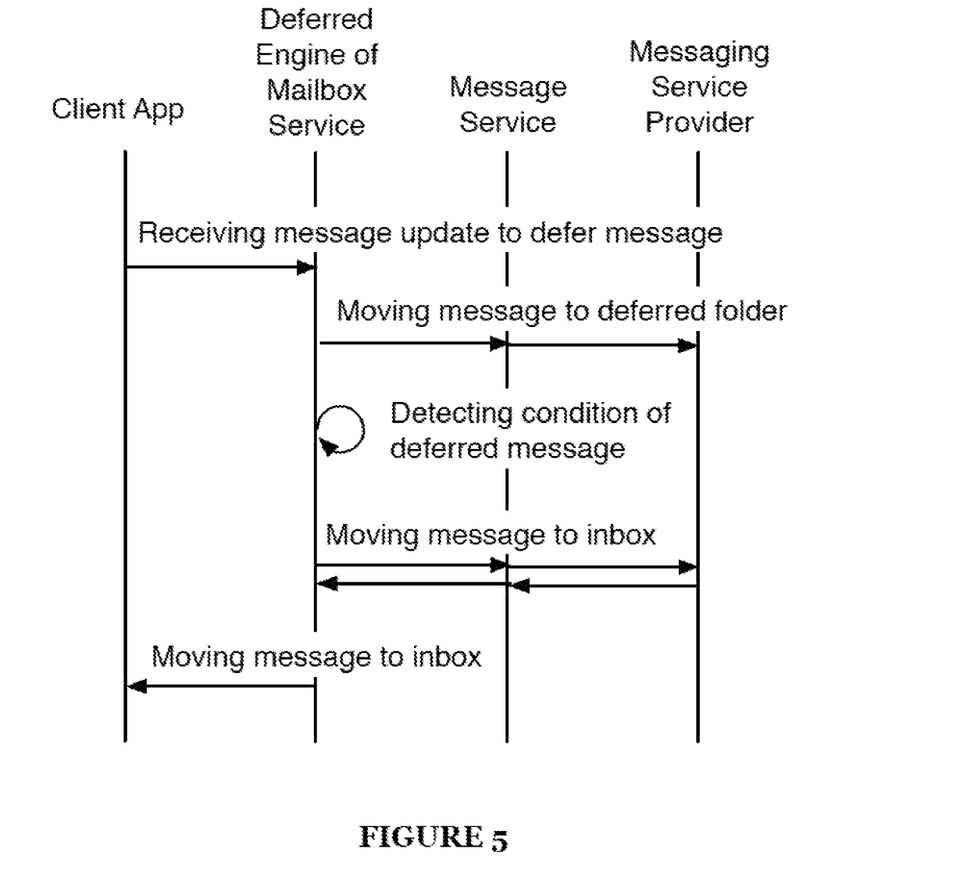
FIG. 5 is a communication flow representation of processing a deferral message update.

Managing a deferred message S130 preferably includes receiving a message update that indicates a deferral action, updating message to reflect the deferred state of the message, and upon satisfying the condition invoking a selected action on the message as shown in FIG. 5. The deferral action message updates originate from client applications, preferably in response to active user selection of a message deferring option (e.g., moving the item to a deferred message stream). Once received, the message is preferably moved to a new location. There is preferably a special message folder, list or stream that contains all messages that have been deferred. In another variation, a folder or label may be created to more finely segment deferred messages (e.g., folders deferred until tomorrow, messages deferred to next week, messages deferred greater than a year). Alternatively, the message may be archived, unaltered, or handled in any suitable manner. The reorganization of the message, if any, is preferably communicated and synchronized with the messaging service provider. The deferral action is preferably transparent to that of the message service provider. The message service provider only notices the message being moved into a new folder. Additionally, a deferred data engine preferably updates a deferred datasource to store references to the message and the conditions upon which the condition will be triggered. Managing a deferred message can additionally include monitoring the condition variables of the deferred message. If the condition is a time condition, a time alert or scheduling system can be used to set a service to alert the deferred data engine to act on a deferred message action. If the condition is based on less predictable or dynamic properties, the system may actively monitor those conditions continuously. Once the condition is satisfied, the service invokes the conditional action on the message. Invoking the action preferably synchronizes the change with the message service provider and the client application. The action is preferably a notification action that includes moving the message to the inbox. More preferably, moving the message to the inbox includes moving the message to the inbox with heightened priority. Heightened priority can include setting the message to appear at the top of the inbox, flagging the message, marking as unread, increasing urgency of the message, or any suitable alteration to the message and/or message thread to draw attention to the message. Preferably, the deferred data engine creates a message update request to move the message. Through operation of the system, this update is propagated to the message service provider. Either simultaneously or in response of the update to the message service provider, a client application is notified of the request to move the message to the inbox.

Block S140, which includes at a client application, natively interpreting messages in client message format, functions to display and receive message updates and interactions. Messages are preferably received from the mailbox service in a native message format. The message preferably encodes any message formatting in a manner so that native application view tools may be used in creating natively rendered versions of the message content. In some variations, formatting from incoming HTML emails may be completely removed. In other variations, at least a subset of the formatting may be preserved but rendered through native view formatting. Relying on native rendering enables more efficient rendering of display elements, as a benefit the client application appears more responsive. Interactions on the client application preferably aggressively respond to user input and defer communication to connection services. The client application preferably depends on a robust asynchronous data, message, and message update communication. For example, the client application may be able to avoid any progress indicator visual elements (e.g., a spinner) for downloading content or content upload.

Block S150, which includes cooperatively relaying messages amongst the message service, the mailbox service, and the client application, functions to coordinate message distribution of messages between client device and a message service. Relaying messages preferably includes queuing messages inbound to client application, queuing messages outbound from client application, queuing message data to the mailbox service, and queuing message updates for the message service. As described above, there may be two queues to manage the bidirectional communication between the client application and the mailbox service as well as two queues to manage the bidirectional communication between the mailbox service and the messaging service. A queue manages the data and message communication for one direction of communication. Data and message communications are preferably communicated with real-time communication protocols. In one implementation node.js and websockets are used in facilitating the real-time communication. A client application may establish a connection with a connection service that manages connection and data streaming. Additionally messages are preferably windowed in communicating with the client application. As opposed to sending every message in a particular folder or stream, only messages/threads within a particular window are transferred. For example, when a user views a folder on a client application, the mailbox service preferably relays only the 50 most recent messages of the folder. Additionally when relaying messages, a specialized network communication protocol may be used that is designed for message communication; alternatively HTTP or any suitable protocols may be used.

Additionally, the method may include resolving conflicts of relayed messages, which functions to bring messages to a state of eventual consistency. The method is preferably implemented with a plurality of components distributed between different devices. Asynchronous and queued communication can bring considerable speed and responsiveness to the client application, but at times, the state of messages may be inconsistent between different modules. The state of any one component of the message platform preferably maintains internally consistent state. In particular, the client application can perform any number of message interactions while maintaining the state of mail on the client application. If for example, the client application has no access to a network, a user can preferably continue to read, send, delete, and organize messages. These changes are preferably communicated through the mailbox service to the message service provider once the client application has network access. Message actions and data are preferably marked with a revisioning number. Inconsistency of state is preferably resolved according the revisioning number. There may additionally be state priority between different components of the message system. For example, in many cases, message state set by a message service server preferably has priority over other components due to the fact that the message service communicates directly with the message provider.

Additionally, a method of a preferred embodiment may include converting message data attachments to internally routed data files, which functions to handle attachments as accessible resources as opposed to message content. An email or other message attachment is preferably converted to an inline attachment. Attachments are preferably uploaded to an attachment server, and a reference to the attachment resources is included in the message. In a similar variation, superfluous attachments (e.g., email signature images) may be automatically detected and the attachment may be removed or hidden from the message altogether. When a user wants to view an attachment, the user will activate a link or button, which will result in the retrieval of the attachment on the attachment server. The attachment may be unmodified, but can additionally be a modified version of the original file. For example, images may be reduced in size for mobile viewing, or other media types may be converted for viewing on the device. The attachment server/service may automatically generate modified forms of the original file. Pictures may have a set of various sizes generated for use within an application. Text documents may be converted to another format more readily used within email. Music or video files may be converted for streaming to the client application. Additionally, the attachments can be synchronized with a user account of a file hosting service. For example, a user may authenticate an account for a cloud file synchronization platform such as Dropbox, and attachments can be synchronized with the cloud files system of the user account.

Figure 6:
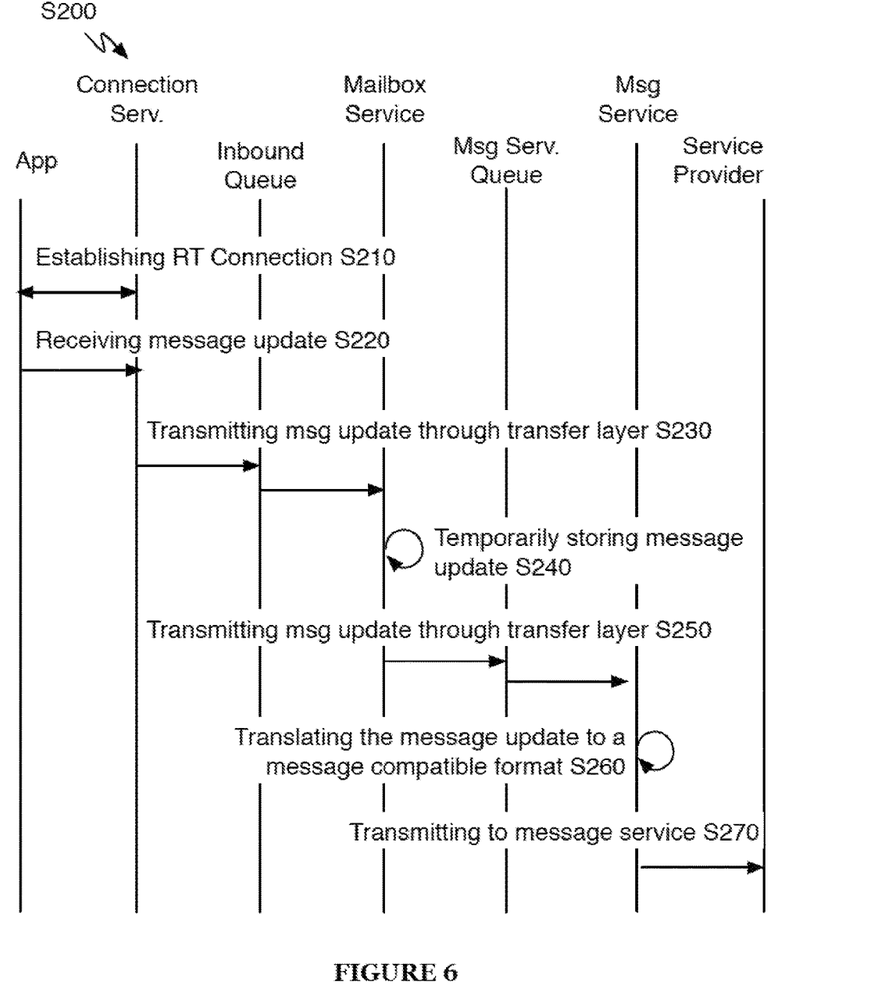
FIG. 6 is a communication flow representation of a method for synchronizing messages of a second preferred embodiment.

As shown in FIG. 6, a method S200 for synchronizing messages between client applications and a message service provider of a preferred embodiment includes maintaining a plurality of real-time connections between the connection service and a client application S210; receiving a message update through a connection with a client application S220; transmitting the message update through an inbound queue of a first transfer layer to a messaging service layer S230; temporarily storing the message update S240; transmitting the message update through a message service queue of a second transfer layer to a mailbox service layer S250; translating the message update to a message format compatible with a message service provider S260; and transmitting the translated message update to the message service provider S270. The method S200 functions to deliver a message update from the client application to a message service provider. The message update can include a new message, a reply to a message, a forwarded message, a deletion of the message, the archival of message, the sorting or organization of message to a folder/list/category, starring the message marking as read/unread, and/or any suitable message action or change. Similar to the above embodiments, the method enables a client application to interface with an existing message provider, such as an email provider, while providing several modern application features. For example, the method S200 affords an application with real-time connection capabilities, responsive online/off-line message handling, native rendering of the message, and the like. While the method S200 describes the transmission of a message to a message service provider, the method S200 preferably implemented then or alongside the other described methods and/or their variations.

Block S210, which includes maintaining a plurality of real-time connections between the connection service and a client application, functions to establish communication channels with applications operable on a multitude of remote user devices. Block S210 is preferably implemented at a connection service with managed connections. Preferably, when a user opens a client application, the client application calls out to a host of the backend infrastructure. The connection service then creates an open communication channel. In one variation, the connection service creates a web socket connection. The backend infrastructure is preferably implemented to serve the accounts on shared resources, and thus the connection service preferably maintains the connections for multiple accounts. Additionally, multiple instances of a client application for one account may have two or more connections established. Message updates can be received on any of the connections. When establishing a connection, the account of the client application is preferably authenticated. Block S210 can additionally include managing version control of the client application. When the connection is established with the client application, the connection service verifies the version number of the client application. Based on the version number, client applications can be disabled, features can be disabled/enabled, upgrade notifications can be delivered, or any suitable action can be taken.

Block S220, which includes receiving a message update through a connection with a client application, functions to receive a change to a message, message thread, message organization, or messaging account that was initiated by a client application. Preferably, the initiated message update is transmitted to the backend infrastructure in response to a user action. In one variation, a single message update is delivered to the backend infrastructure at a particular time. In one variation, a client application can be configured to enable off-line message interactions. Within the offline client application, the user can seemingly modify messages, organize messages, delete messages, send or edit messages, or make any suitable message updates without a connection to a network. The client application preferably maintains message state and will mark message updates internally with revision identifiers. When the client application establishes a connection to the network, a batch of message updates can be uploaded through a connection to the connection service. The revision identifiers are preferably included in the message update to infrastructure and can be used in conflict resolution with message updates that were issued by the message service provider while the client application was off-line. As discussed, messages on the client application and the message service provider are eventually consistent.

Block S230, which includes transmitting the message update through an inbound queue of a first transfer layer to a mailbox service layer, functions to transfer message updates to the mailbox service layer in a scalable manner. The message queue handles the influx of message updates from various accounts and over client application instances. In one variation, a single inbound queue is used for all accounts, but alternatively multiple peers can be dynamically delivered message updates to load balance or distribute processing load. The inbound queue can use rabbitMQ or any suitable queuing service. The message updates are preferably dequeued from the inbound queue at a rate based on the available capacity of the mailbox service layer.

Block S240, which includes temporarily storing the message update, functions to cache the message update and perform preliminary processing. Block S230 is preferably performed at the mailbox service, and the mailbox service layer preferably translates message updates into message service instructions. For example, a message update to archive a message can be translated into an email service update that signifies a specific email thread to be archived. Mailbox service can additionally obfuscate the email message, such that the message is in the format substantially unreadable by humans.

Similar to Block S230, block S250, which includes transmitting the message update through a message service queue of a second transfer layer to a messaging service layer, functions to transfer message updates to the message service layer. Block S240 is substantially similar to Block S220. The queue preferably holds the message update as translated by the mailbox service layer. The queue can alternatively hold any suitable form of the message update.

Block S260, which includes translating the message update to a message format compatible with a message service provider, functions to prepare the message for transmission to the message service provider. The translation is substantially similar to that described above. In the scenario where the message update includes new message content, any native message formatting is preferably converted to suitable html elements or plain text content. The translation preferably occurs at the message service layer upon a message update dequeuing and being received at the message service layer. The message service layer may additionally translate the message update to a sequence of instructions that should be relayed to the message service provider to complete the update. This further translation is preferably customized to the particular message service provider that is being used. If the message service provider is an email service provider, then IMAP instructions may be selected or generated. For example, to move an email message to a folder, the instructions may include a copy, store, and expunge IMAP commands to achieve the effects of moving the message. Block S260 may additionally include selecting an appropriate message service module in the scenario where multiple message providers are used.

Block S270, which includes transmitting the translated message update to the message service provider, functions to synchronize the message update with the message service provider. The message service layer preferably transmits the translated message update. An IMAP connection is preferably used to connect with the message service provider, but any suitable connection may alternatively be used. The message update is preferably made on behalf of an account configured on an originating client application. Preferably, a single IMAP connection is maintained. Message updates originating from different client application instances but with the same account can share the IMAP connection. In some scenarios, this can avoid enforcement of an IMAP connection limit.

Figure 7:
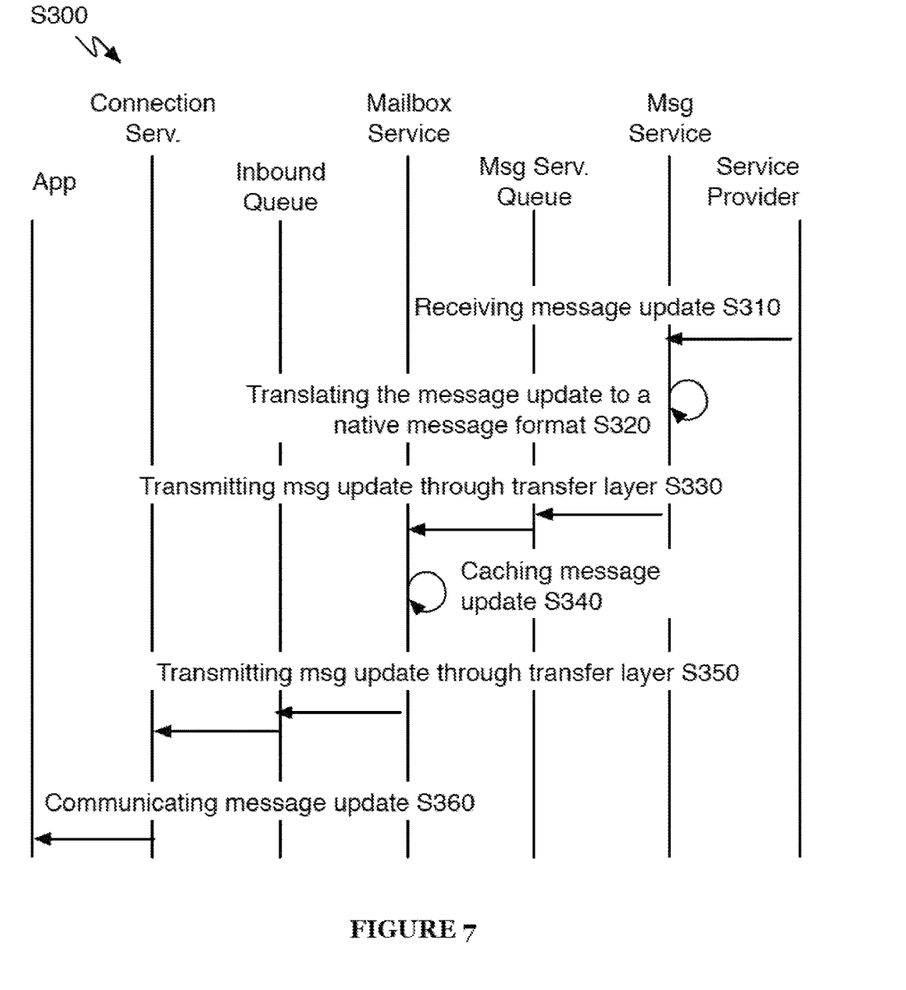
FIG. 7 is a communication flow representation of a method for synchronizing messages of a third preferred embodiment.

As shown in FIG. 7, a method S300 for synchronizing messages between client applications and a message service provider of a preferred embodiment can include receiving a message update from a message service provider S310; translating the message update to message thread format compatible with native rendering on a client application S320; transmitting the translated message update through a mailbox service queue to a mailbox service layer S330; caching the message update until message update can be communicated to a client application S340; transmitting the message update through an outbound queue to a connection service S350; and communicating the message update to at least one client application S360. The method S300 is a contrasting message synchronization scenario compared to S200—a message update originating from the message service provider is delivered to at least one client application connected to the system. Method S300 can share many commonalities with method S200. For example, blocks S330 and S350 can be substantially similar to blocks S250 and S230 respectively, except in that the transmission is in the opposite direction. As described above methods S200 and S300 preferably occur simultaneously with general operation of method S100.

Block S310, which includes receiving a message update from a message service provider, functions to transfer the state of a messaging account to the system. The message update from the message service provider can include any changes on the message service provider. These changes may be based on new incoming messages sent by other entities or changes made by a user of a message account on an outside client device. For example, if the user moves an email to a new folder on a web interface of the outside message service provider, that change can be communicated down to the client application. The client application is preferably kept in a state that is eventually consistent with the message service provider, which can be treated as a definitive source of the state of the messages. Such message updates may be initiated on-demand after a client application requests to access portions of content. In this way, information of the state of the messages is only delivered to the client application as the information is required.

Block S320, which includes translating the message update to message thread format compatible with native rendering on a client application, functions to convert the message update to an internal representation of the message update. The message service layer preferably includes a module or at least a set of rules that determines message translation. Translating the message update preferably normalizes the communication from the message service provider to a format that can be natively interpreted by a client application. The received message update may additionally have a revision identifier assigned. The revision identifier is preferably based on a time stamp of a received message or the time an instruction was received. In one scenario, the message update may be a new message with an attachment. In one variation, translating the message update to a message thread format may include changing a file attachment to an inline attachment. The attachment file is preferably uploaded and hosted on an attachment service, and an attachment inline reference is inserted or added to the message.

Block S340, which includes caching the message update until the message update can be communicated to a client application, functions to hold message updates until the client application is ready to receive the message update. In one variation, the client application may or may not have an active connection to the connection service. For example, the user may not have the application open, or the application may be in a sleep mode. When the client application is ready to receive message updates, a connection is established, and cached message updates can be delivered. In one scenario, the resources used to deliver the message update may be at capacity, and the mailbox service layer holds the message updates until the content is ready for delivery. The message updates can be temporarily cached at the mailbox service layer. This preferably occurs upon dequeuing a message update from the message service queue and receiving the message update at the mailbox service layer. In one variation, the mailbox service layer or alternatively the message service layer can cache a model of the messages of an account, but only deliver relevant portions to the client application, which would reduce latency when needing to pull load content from the message service provider. For example, the messages contained within a rarely accessed folder may be maintained on the backend infrastructure. When the user does access the folder on the client application, the folder can be populated with the content without having to request the folder contents from the message service provider. In a similar manner the messages are preferably windowed/paginated so that only relevant messages are transmitted to the client application. For example, the account may have over one hundred new messages, but instead of transferring all the messages to the client application, the first fifty messages are transmitted. Windows/batches of fifty messages can be dynamically transmitted as the user scrolls or requests more messages.

Block S360 includes communicating the message update to at least one client application. The connection preferably uses a realtime communication protocol such as using node.js and compressed websockets. The connection service preferably implements size-selective data compression to enable rapid delivery to the client application. As one variation, the connection service may include multiple connections to different account instances on a client application (i.e., same account being used on multiple devices). The communicating the message update can include multiplexing the message update to multiple client application instances.

Figure 8:
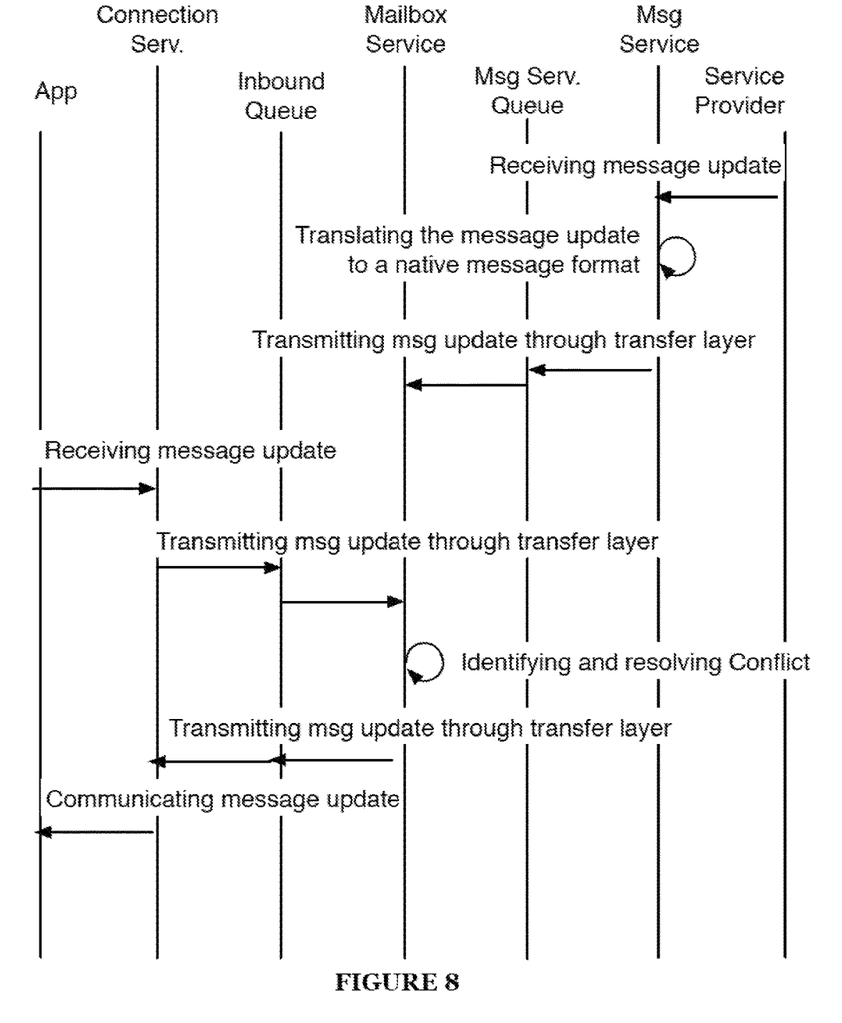
FIG. 8 is communication flow representation of resolving message conflicts of a preferred embodiment.

Additionally, method S300 and similarly method S200 can include resolving conflicts. As discussed above, message updates can be assigned a revision identifier. The revision identifier can be used to determine race conditions. Additionally, different layers (e.g., mailbox service layer or the message service layer) or different sources (e.g., initiated by the client application or initiated by a message service provider) can have different weighting or levels of authority such that when revision identifiers cannot be solely used to resolve a conflict, the state of the highest priority source is treated as the current state. As shown in FIG. 8, a message conflict can occur if message updates by the client application conflict with the message updates by the message service provider. A conflict resolution engine preferably identifies the conflicting actions, and responds. The conflict may detected if two message updates conflict, alternatively, the conflict may occur when contacting either the message service provider or the client application.

An alternative embodiment preferably implements the above methods in a computer-readable medium storing computer-readable instructions. The instructions are preferably executed by computer-executable components preferably integrated with a message delivery system. The computer-readable medium may be stored on any suitable non-transitory computer readable storage media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A system comprising:
    a connection service configured to communicate with a plurality of client messaging application instances;
    a mailbox service layer configured to temporarily store and process message updates inbound from and outbound to one or more of the client messaging application instances;
    a message service layer configured to communicate with one or more outside message service providers and to translate message updates to a message format compatible with native rendering by a client messaging application instance, wherein one of the message updates comprises a message with an attachment, and wherein a translated message update corresponding to the one of the message updates includes an in-line reference for retrieval of the attachment that is stored on an attachment server, wherein the attachment of the one of the message updates is stored on the attachment server when the one of the message updates is translated to its corresponding translated message update;
    a first intermediary transfer layer communicatively coupled between the connection service and the mailbox service layer, the first intermediary transfer layer including a first inbound message data queue to transfer message updates from the plurality of client messaging application instances to the mailbox service layer and a first outbound message data queue to transfer message updates from the mailbox service layer to the connection service for communication to one or more of the client messaging application instances; and
    a second intermediary transfer layer communicatively coupled between the mailbox service layer and the message service layer, the second intermediary transfer layer including a second inbound message data queue to transfer translated message updates from the message service layer to the mailbox service layer and a second outbound message data queue to transfer message updates from the mailbox service layer to the message service layer.

2. The system of claim 1, wherein the message service layer is configured to communicate with one or more outside message service providers including at least one email message service provider.

3. The system of claim 2, wherein the message service layer is configured to maintain an IMAP connection to an account maintained at the outside email message service provider and wherein the plurality of client messaging application instances include at least two client messaging application instances configured to interact with the account.

4. The system of claim 2, further comprising a conflict resolution module configured to resolve conflicts between two or more message updates within one or both of the mailbox service layer and the message service layer.

5. The system of claim 2, wherein the message service layer comprises a message processor configured to convert email messages to a native client format.

6. The system of claim 5, further comprising an attachment server configured to store resources corresponding to email attachments, wherein the message processor is configured to transform an email attachment in an email message to a reference to a resource stored by the attachment server.

7. The system of claim 1, wherein the message service layer includes a plurality of service provider modules, wherein each of the service provider modules is configured to interact with a different one of a plurality of outside message service providers.

8. The system of claim 1, wherein the mailbox service layer includes a deferred data engine configured to conditionally apply a message update to a message.

9. The system of claim 1, wherein the connection service is configured to communicate with a plurality of client messaging application instances using a real-time protocol connection.

10. The system of claim 9, wherein the real-time protocol connection includes a compressed websocket connection.

11. A method comprising:
at a message service layer, receiving a message update from a message service provider, the message update associated with an account;
at the message service layer, translating the message update to a message format compatible with native rendering by a client application instance, wherein one of the message updates comprises a message with an attachment, and wherein a translated message update corresponding to the one of the message updates includes an in-line reference for retrieval of the attachment that is stored on an attachment server, wherein the attachment of the one of the message updates is stored on the attachment server when the one of the message updates is translated to its corresponding translated message update;
transmitting the translated message update through a message service queue to a mailbox service layer;
at the mailbox service layer, caching the message update for communication to a client application instance associated with the account;
transmitting the message update through an outbound queue to a connection service; and
communicating the message update from the connection service to the client application instance associated with the account.

12. The method of claim 11, further comprising resolving a message state consistency conflict between the message update received from the message service provider and another message update originating from the client application instance associated with the account.

13. The method of claim 12, wherein resolving the message state consistency conflict comprises:
assigning a revision identifier to each of the message updates; and
resolving the message state consistency conflict based on the revision identifier.

14. The method of claim 11, wherein translating the message update to a message format compatible with native rendering on a client application instance includes:
converting a message attachment to a file;
uploading the file to an attachment service; and
including in the translated message update a reference to a location of the file on the attachment service.

15. The method of claim 11, wherein communicating the message update to the client application instance includes communicating the message update as part of a set of windowed message updates to the client application instance.

16. A non-transitory computer readable medium including one or more sequences of instructions which, when executed by one or more processors, cause:
at a message service layer, receiving a message update from a message service provider, the message update associated with an account;
at the message service layer, translating the message update to a message format compatible with native rendering by a client application instance, wherein one of the message updates comprises a message with an attachment, and wherein a translated message update corresponding to the one of the message updates includes an in-line reference for retrieval of the attachment that is stored on an attachment server, wherein the attachment of the one of the message updates is stored on the attachment server when the one of the message updates is translated to its corresponding translated message update;
transmitting the translated message update through a message service queue to a mailbox service layer;
at the mailbox service layer, caching the message update for communication to a client application instance associated with the account;
transmitting the message update through an outbound queue to a connection service; and
communicating the message update from the connection service to the client application instance associated with the account.

17. The non-transitory computer readable medium of claim 16, further comprising resolving a message state consistency conflict between the message update received from the message service provider and another message update originating from the client application instance associated with the account.

18. The non-transitory computer readable medium of claim 17, wherein resolving the message state consistency conflict comprises:
assigning a revision identifier to each of the message updates; and
resolving the message state consistency conflict based on the revision identifier.

19. The non-transitory computer readable medium of claim 16, wherein translating the message update to a message format compatible with native rendering on a client application instance includes:
converting a message attachment to a file;
uploading the file to an attachment service; and
including in the translated message update a reference to a location of the file on the attachment service.

20. The non-transitory computer readable medium of claim 16, wherein communicating the message update to the client application instance includes communicating the message update as part of a set of windowed message updates to the client application instance.

* * * * *